United States Patent [19]

Thies

[11] 4,423,674
[45] Jan. 3, 1984

[54] BELT PRESS WITH HOSE-TYPE HYDRAULIC FORCE TRANSMITTER

[75] Inventor: Peter Thies, Ennepetal-Voerde, Fed. Rep. of Germany

[73] Assignee: Wagener Schwelm GmbH & Co., Schwelm, Fed. Rep. of Germany

[21] Appl. No.: 286,669

[22] Filed: Jul. 24, 1981

[30] Foreign Application Priority Data

Jul. 26, 1980 [DE] Fed. Rep. of Germany ....... 3028401

[51] Int. Cl.³ ............................................. B30B 15/06
[52] U.S. Cl. .................................... 100/99; 100/93 P; 100/258 A; 100/270; 100/269 A; 100/290; 100/295; 156/583.1
[58] Field of Search ................ 100/93 P, 99, 258 A, 100/258 R, 270, 271, 290, 295; 156/580, 583.1; 425/338, 343, 384, 385, 394, 406, 410

[56] References Cited

U.S. PATENT DOCUMENTS

| | | | |
|---|---|---|---|
| 2,363,779 | 11/1944 | Duffy et al. | 100/269 A |
| 2,411,043 | 11/1946 | Klassen | 100/93 P |
| 3,808,968 | 5/1974 | Notin | 100/269 A X |

FOREIGN PATENT DOCUMENTS

| | | | |
|---|---|---|---|
| 2029853 | 1/1972 | Fed. Rep. of Germany | 100/93 P |
| 2248810 | 4/1974 | Fed. Rep. of Germany | 100/93 P |
| 14904 | of 1899 | United Kingdom | 100/269 A |
| 598766 | 3/1978 | U.S.S.R. | 156/583.1 |

Primary Examiner—Billy J. Wilhite
Attorney, Agent, or Firm—Karl F. Ross; Herbert Dubno

[57] ABSTRACT

A belt press has a plurality of upper and a plurality of lower traverses respectively having lower and upper traverse faces, upper and lower press platens carried on and between these traverses and having respective upper and lower platen faces respectively confronting the lower and upper traverse faces, and mechanically actuated bolts engaged between the traverses for displacing them toward each other and thereby pressing the platens against a belt engaged between them. The belt press also has at least one bend-compensating element having a pair of nonparallel upper and lower surfaces and engaged between one of the platen faces and the confronting traverse faces, and a hydraulic force transmitter engaged between this bend-compensating element and one of the respective press and platen faces. The transmitter is formed of a plurality of diametrally compressible but circumferentially unstretchable hydraulic hoses forming at least one substantially closed chamber of a predetermined maximum volume, and of a body of an incompressible fluid only partially filling this chamber.

10 Claims, 6 Drawing Figures

BELT PRESS WITH HOSE-TYPE HYDRAULIC FORCE TRANSMITTER

FIELD OF THE INVENTION

The present invention relates to a press. More particularly this invention concerns a press of the type used to repair belts or to join together belt sections into an annular belt.

BACKGROUND OF THE INVENTION

A belt press normally has a plurality of upper and a plurality of lower traverses respectively having lower and upper traverse faces with the traverses all parallel and each upper traverse lying above a respective lower traverse. Upper and lower heatable press platens are carried between these traverses and in turn have respective upper and lower platen faces respectively confronting the lower and upper traverse faces. Thus a belt to be pressed can be engaged between the platens. Mechanically actuated means including bolts is engaged between each lower traverse and the respective upper traverse for displacing the traverses toward each other and thereby pressing the platens against the belt between them. During a pressing operation the platens bend somewhat from their normally planar shape, as the platens are not made stiff enough to avoid such bending in order to cut down on equipment weight.

Normally some sort of pressing system is provided between the movable platen and the respective traverses. Such a system normally comprises an array of screw-type jacks engaged between this movable platen and the respective traverses, with several such jacks between each traverse and the respective movable platen.

These jacks must be actuated individually but in a very careful manner so as to bring as even a force as possible to bear on the belt clamped between the press platens. The machine operator must therefore tighten each jack a small amount, moving through the array according to a predetermined pattern. As a rule this tightening pattern must be followed several times to incrementally increase the pressure over the whole platen without increasing it too much at any one location.

The main disadvantage of this system is that, even if enormous pains are taken, the movable platen is unevenly pressed downwardly. The number of jacks is limited and the feet or shoes through which the jacks bear must be limited also so as not to take up the entire movable platen. Even with such a system in the hands of a careful operator, it is still normally impossible to achieve even loading of the movable press platen.

OBJECTS OF THE INVENTION

It is therefore an object of the present invention to provide an improved belt press.

Another object is the provision of such a press which is substantially easier to operate than the prior-art such presses.

A further object is to provide a belt press wherein relatively even pressure can be brought to bear without using complex equipment.

SUMMARY OF THE INVENTION

These objects are attained according to the instant invention in a belt press of the above-described general type, that is comprising a plurality of upper and a plurality of lower traverses respectively having lower and upper traverse faces, upper and lower press platens carried on and between these traverses and having respective upper and lower platen faces respectively confronting the lower and upper traverse faces, and mechanically actuated means including bolts engaged between the traverses for displacing them toward each other and thereby pressing the platens against a belt engaged between them. The system according to the instant invention also has at least one bend-compensating element having a pair of nonparallel upper and lower surfaces and engaged between one of the platen faces and the confronting traverse faces, and a hydraulic force transmitter engaged between this bend-compensating element and one of the respective press and platen faces. The transmitter is formed of a plurality of diametrally compressible but circumferentially unstretchable hydraulic hoses forming at least one substantially closed chamber of a predetermined maximum volume, and of a body of an incompressible fluid only partially filling this chamber. The hoses can be of standard construction, that is of circular cross section and formed of a filament-reinforced elastomer.

The bend-compensating element is shaped to conform to the bend line of the platen. This line is the curved line a straight line through the press forms when the press is at its standard operating pressure. Normally this element is formed with one planar and one curved surface, but it distorts in use to have two curved surfaces.

With the system according to the instant invention, therefore, the mechanical actuator can be used to close the press. Force will be distributed perfectly evenly to the movable platen over its entire surface at the standard operating pressure of the press, because the bend compensator will fill in the space between each bowed traverse and the planar movable platen. The hoses will ensure perfectly uniform pressure distribution over the entire assembly, in particular when according to another feature of this invention these hoses are all interconnected to form a single such chamber of maximum volume when the hoses are not compressed.

According to further features of this invention, connectors interconnect the hoses and a pressure gauge is provided for indicating the pressure in the chamber. If the hoses are not interconnected, a quick-release coupling is employed to allow this pressure gauge to be moved from hose to hose. Either way, the pressure gauge will give an exact reading of the pressure exerted by the movable platen on the belt workpiece.

A pressure member can lie according to this invention between the hoses and the respective press platen. To protect the hoses from the heat of the movable press platen, this pressure member is of thermally insulating material.

The hoses of this invention may be provided in pairs underneath each of the traverses. It is also possible for these hoses to extend transverse to the traverses, in particular in the system wherein all of the hoses are interconnected.

In accordance with another feature of this invention the chamber is filled, in an uncompressed condition of the hoses, to between 70% and 80% of its volume with the uncompressible fluid, normally hydraulic liquid, used as a force-transmitting element. The rest of the chamber is filled with a compressible fluid, normally air.

In compressed condition the hoses engage one another laterally.

DESCRIPTION OF THE DRAWING

The above and other features and advantages will become more readily apparent from the following, reference being made to the accompanying drawing in which.

SPECIFIC DESCRIPTION

Figure 1:
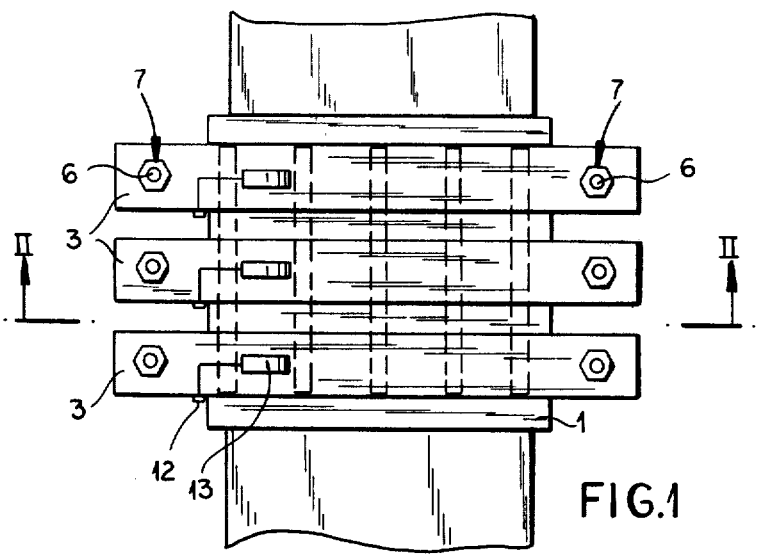
FIG. 1 is a top view of a press according to this invention.
Figure 2:
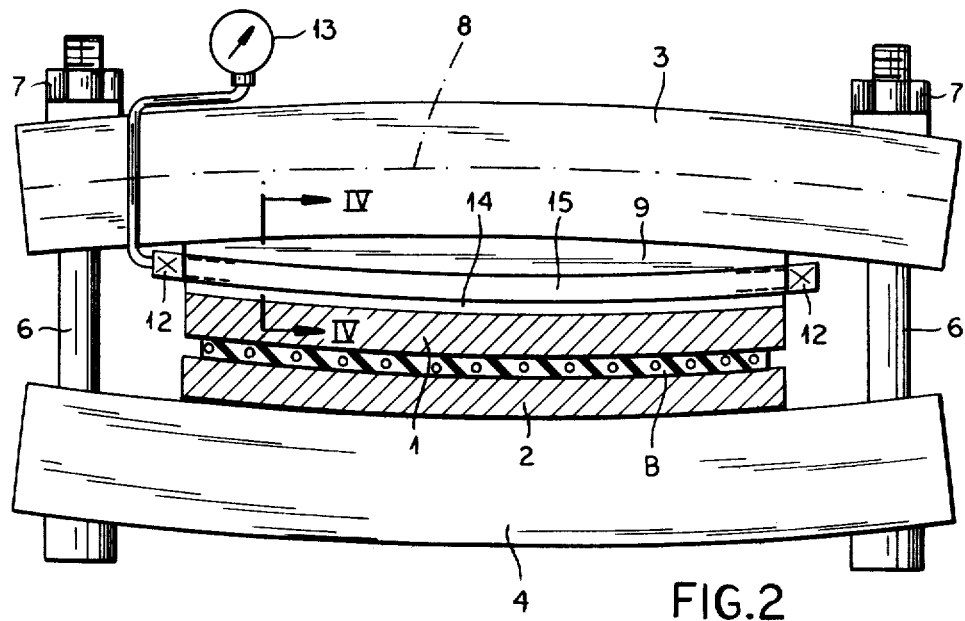
FIG. 2 is a section taken along line II—II of FIG. 1.

As seen in FIGS. 1 and 2, a press for making or repairing a cable-reinforced belt B has a movable upper press platen 1 and a fixed lower press platen 2 respectively juxtaposed with heavy-duty upper and lower traverses 3 and 4. A hydraulic force-transmitting member 5 described below in greater detail is engaged between a bend-compensating element 9 and an insulating plate 14 on top of the upper movable platen 1. The platens 1 and 2 are flat and have parallel planar surfaces and the traverses are similarly straight with planar surfaces.

Figure 3:
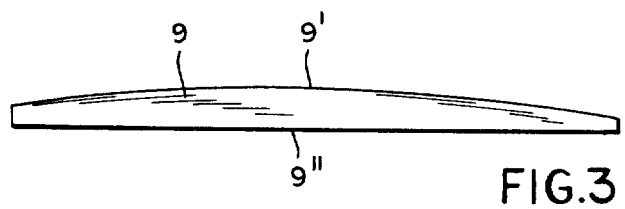
FIG. 3 is a side view of a bend compensator according to this invention.

Vertical tie bolts 6 each have a lower end fixed in a respective outer end of a respective lower traverse 41 and an upper end extending through the corresponding end of the respective upper traverse 3 and provided thereabove with a nut 7 that can be tightened to clamp the press on the workpiece B. When these nuts 7 are screwed down to clamp the belt B with the standard operating pressure a straight line on the traverse 3 is deformed to the bend line 8 indicated in exaggerated form in FIG. 2. This bend line 8 corresponds to the shape of the upper surface 9' of the bend-compensator element 9 whose lower surface 9" is planar as shown in FIG. 3.

Figure 4:
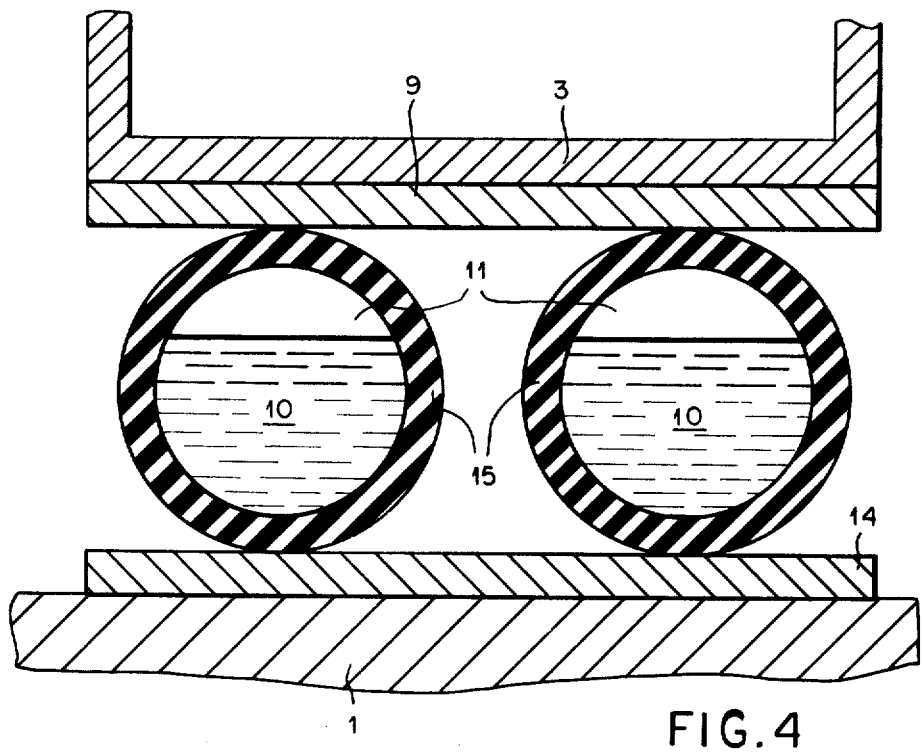
FIGS. 4 and 5 are large-scale sections taken along line IV—IV of FIG. 2 respectively showing the hoses in uncompressed and compressed condition.
Figure 5:
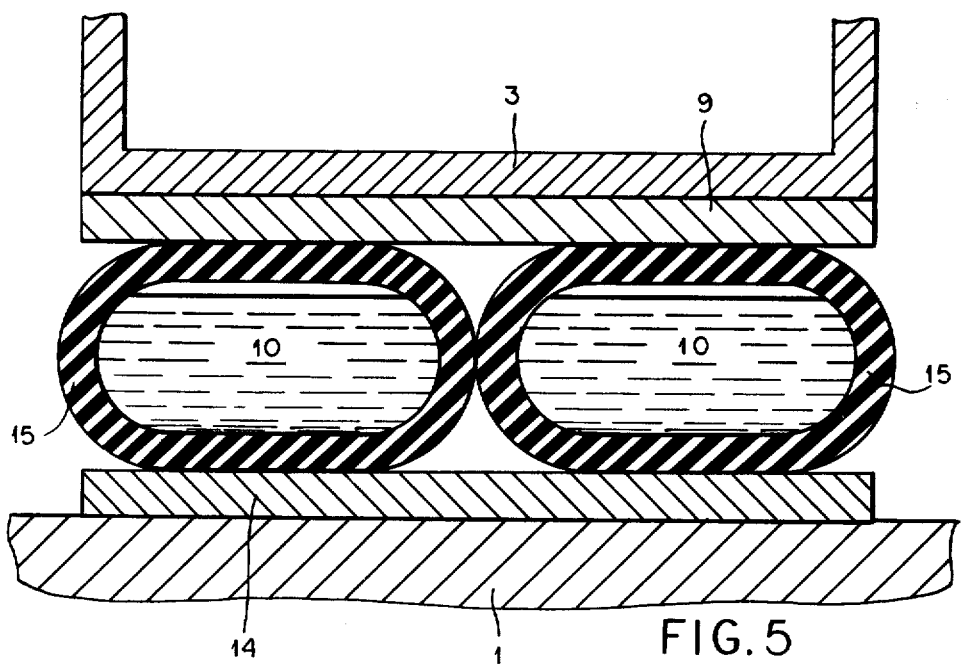
Figure 6:
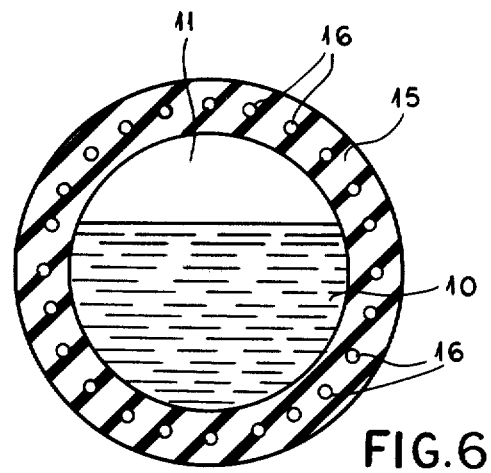
FIG. 6 is a large-scale cross section through a detail of the system of this invention.

The hydraulic force transmitter 5 is formed as shown in FIGS. 4 and 5 of a plurality of hose sections 15 joined together at fittings 12 (FIG. 2) so that their interiors are all interconnected and form a single chamber that is at maximum volume when the press is open as shown in FIG. 4. This chamber is 75% filled with a noncompressible hydraulic liquid 10, and 25% filled with air 11 and, as also shown in FIG. 6, is provided with reinforcement filaments 16.

Figure 7:
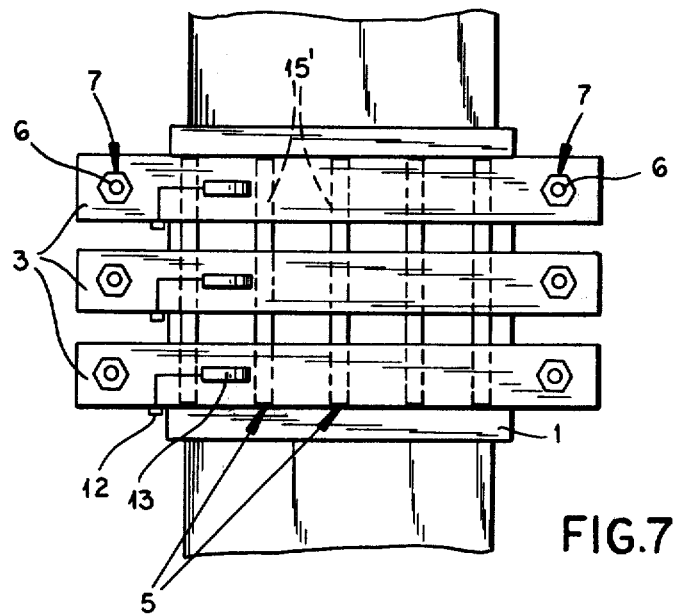
FIG. 7 is a top view like FIG. 1 illustrating another arrangement according to the invention.

Two hose sections 15 can extend parallel to and between each compensator 9 and plate 14. A pressure gauge 13 is connected to each such pair of hose sections 5, or a single such pressure gauge 13 can be connected to all of the interconnected hose sections 15. It is also possible as shown in FIG. 7 to have hose sections 15' extending transverse to the traverses 3 and 4, in which case it is most advisable to interconnect all of their interiors into a single chamber.

In use the force transmitter 5 ensures even transmission of force from the respective upper traverse 3 down to the respective upper platen 1. When the press operating pressure is reached, and the traverses bow as shown at bend line 8, the compensator 9 ensures that the platens 1 and 2 remain parallel for even pressing of the belt B. The combination of the bend compensator 9 and the force transmitter and distributor 5 ensures almost perfectly uniform distribution of pressing pressure. When fully stressed the hose sections 15 engage each other laterally for solid buttressing against each other. Thus it is possible with the system according to the instant invention to use the relatively simple mechanical actuator constituted by the nuts 7 to bring a very uniform force to bear on the belt B. If one of the nuts 7 is turned somewhat more than the others, the pressure will automatically be equalized by the system of this invention.

The system according to the instant invention can therefore replace a relatively complex actuating system. It will give results substantially better than have hitherto been obtainable, and will at the same time be substantially easier to operate.

I claim:

1. A belt press comprising:
   a plurality of upper and a plurality of lower traverses respectively having lower and upper traverse faces;
   upper and lower press platens carried on and between said traverses and having respective upper and lower platen faces respectively confronting said lower and upper traverse faces, whereby a belt to be pressed can be engaged between said platens;
   at least one bend-compensating element having a pair of nonparallel upper and lower surfaces and engaged between one of said platen faces and the confronting traverse faces;
   a hydraulic force-transmitter engaged between said bend-compensating element and one of the respective traverse and platen faces, said transmitter being formed of a plurality of diametrally compressible but circumferentially unstretchable hydraulic hoses forming at least one substantially closed chamber of a predetermined maximum volume, and of a body of an incompressible fluid only partially filling said chamber; and
   mechanically actuated means including bolts engaged between said traverses for displacing said traverses toward each other and thereby pressing said platens against a belt engaged therebetween.

2. The belt press defined in claim 1 wherein said hoses are all interconnected to form a single such chamber of maximum volume when said hoses are not compressed.

3. The belt press defined in claim 2, further comprising connectors interconnecting said hoses and a pressure gauge for indicating the pressure in said chamber.

4. The belt press defined in claim 2, further comprising a pressure member lying between said hoses and the respective press platen.

5. The belt press defined in claim 4 wherein said pressure member is of thermally insulating material.

6. The belt press defined in claim 2 wherein said hoses extend generally parallel to said traverses and are aligned thereunder.

7. The belt press defined in claim 2 wherein said hoses extend transverse to said traverses.

8. The belt press defined in claim 2 wherein said chamber is filled, in an uncompressed condition of said hoses, to between 70% and 80% of its volume with said fluid.

9. The belt press defined in claim 2 wherein in compressed condition said hoses engage one another laterally.

10. The belt press defined in claim 2 wherein said hoses are normally of circular cross section and are formed of a filament-reinforced elastomer.

* * * * *